Patented June 19, 1945

2,378,876

UNITED STATES PATENT OFFICE 2,378,876

ACTINOMYCIN

Selman A. Waksman, Highland Park, and Harold B. Woodruff, New Brunswick, N. J., assignors to Merck & Co., Inc., Rahway, N. J., a corporation of New Jersey No Drawing. Application October 2, 1941, Serial No. 413,324

9 Claims. (Cl. 260—236.5)

This invention relates to new and useful improvements in bio-chemical substances and more particularly in antimicrobial substances.

In accordance with our invention antimicrobial substances are prepared from cultures of *Actinomyces antibioticus*. *Actinomyces antibioticus* is a micro-organism which occurs inter alia in soils. Specifically, it is a fungus of defined morphology characterized by spore-bearing hyphae produced in the form of straight aerial mycelium; the sporophores are arranged in clusters, no spirals being formed; the spores are nearly spherical to somewhat elliptical. *Actinomyces antibioticus* is fully described and characterized in our publication, Journal of Bacteriology, 42, 231–249, (August, 1941).

The following method was used by us for obtaining cultures of micro-organisms capable of antagonizing various specific bacteria. In accordance with this method suspensions of cultures of the specific bacteria are mixed with an aqueous agar solution and the mixture added to a suitable soil containing the antagonizing micro-organisms. Upon one to 10 days' incubation, colonies of the antagonists will form which may be transferred to fresh bacterial nutrient media and later isolated as pure cultures in accordance with conventional methods.

By means of this method, we have isolated an organism which we have described as *Actinomyces antibioticus*. The method of isolation is illustrated in Example IV.

In the practical application of our invention, a suitable culture of *Actinomyces antibioticus* is extracted with a suitable solvent. Suitable solvents are, for instance, ethyl ether, ethyl alcohol, carbon bisulphide, acetone, and chloroform. Ethyl ether is the preferred solvent. Upon evaporation of the solvent, a solid remains. This substance, hereinafter designated as "actinomycin" possesses marked bacteriostatic and bactericidal properties against a large variety of bacteria, antinomycetes and fungi. In most cases, gram-positive bacteria are much more sensitive against the substance than gram-negative organisms. The antinomycin is completely removable by charcoal from liquid media but is only partly removed therefrom by a Seitz filter. The substance is substantially heat resistant at 100° C. for thirty minutes.

We have found that two different antimicrobial substances may be obtained from the actinomycin. These substances, which will be hereinafter referred to respectively as "actinomycin A" and "actinomycin B" may be obtained by selective extraction with suitable solvents from the actinomycin. Thus, for instance, the actinomycin B being substantially soluble in petroleum ether may be extracted as a solution in this solvent in which the actinomycin A is substantially insoluble. Alternatively, instead of extracting the actinomycin A or actinomycin B from actinomycin, they may be obtained by direct selective solvent extraction from the original cultures.

Actinomycin A is a highly pigmented (red) product substantially soluble in either, ethyl alcohol, water, carbon bisulphide, acetone, chloroform and substantially insoluble in petroleum ether. Its aqueous solutions are of a yellow to orange-red color, depending on concentration. The actinomycin B is substantially soluble in ether, carbon bisulphide, acetone, chloroform, petroleum ether, but difficultly soluble in alcohol, and substantially insoluble in water.

The actinomycin A is highly bacteriostatic, gram-positive bacteria being inhibited by dilutions as low as 1:100,000,000; the A compound is also effective, though not in such degree of sensitivity against gram-negative bacteria which are inhibited by concentration of, for example, 1:5,000 to 1:100,000. The actinomycin A also possesses bactericidal activity, through not as pronounced as its bacteriostatic characteristics. The actinomycin B is markedly bactericidal and to a lesser extent bacteriostatic.

Actinomycin A crystallizes from suitable solutions, such as acetone-benzene or acetone-ether mixtures or ethyl-acetate, as vermillion red platelets which melt at 250° C. with slow decomposition. The actinomycin B crystallizes substantially colorless. The A component exhibits characteristic absorption in the visible and ultraviolet regions. It shows strong absorption at 450 m$\mu$ and between 230 and 250 m$\mu$.

The following examples illustrate methods of obtaining actinomycin as well as its A and B components, and it is to be understood that the same is furnished by way of illustration and not of limitation.

Example I

An incubated culture of *Actinomyces antibioticus* was prepared using a medium consisting of 1% tryptone-peptone, 0.5% starch, 0.2% $K_2HPO_4$, 0.2% NaCl and 0.25% agar in distilled water, grown at a temperature of approximately 25° to 35° C., the incubation being complete after six to ten days. Fifty liters of this incubated culture are extracted approximately six times with ether, using 20 liters of ether for each extraction.

The final extract is faintly pale yellow in color, whereas the previous extracts are orange. The combined ether extracts are concentrated to dryness and about 3 gms. of a reddish-brown residue is obtained. The residue is stirred with approximately 400 cc. of petroleum ether for two to three hours, the solvent decanted and the residue treated again with approximately 400 cc. of petroleum ether. A pale yellow oil constituting crude actinomycin B is recovered by evaporation from the petroleum ether.

The dark petroleum ether insoluble residue is dissolved in one liter of benzene with gentle heating. Usually a small amount of black amorphous material remains undissolved and is filtered off. The benzene solution is permitted to drop through a chromatographic tower (60 x 5 cm.) packed with aluminum oxide (according to Brockman). The pigment is readily adsorbed. The column is washed with about one liter of benzene during which operation very little migration of the color bands occurs.

The column is then washed with benzene acetone solution (15:85) whereby a chromatogram develops. By continued washing, light yellow colored pigments pass out of the column. When the main band (orange-red) reaches the lower end of the column, a solution of 30–70 acetone benzene is passed through the column. The latter solvent elutes the pigment and when the eluate is very pale in color, washing is discontinued.

The eluate is concentrated to dryness under reduced pressure, taken up in 25 cc. of hot acetone, filtered, and diluted with ether. The pigment which crystallizes as red-brick colored platelets is essentially pure but may be recrystallized if desired from hot ethyl acetate. An analysis of the product showed C=59.01; H=6.81; N=13.38.

In accordance with our invention, a variety of derivatives of actinomycin A or actinomycin B may be prepared. Thus, for instance, the following Example II recites, by way of illustration, the preparation of the di-acetate of di-hydro actinomycin A.

Example II 25 mgs. of actinomycin A are dissolved in 1 cc. acetic anhydride and to this is added 3 drops of pyridine (or 3 drops triethylamine) and 100 mg. of zinc dust. On stirring, the red mixture becomes pale yellow in color. After one hour at room temperature, the mixture is filtered from the zinc dust and the filtrate is concentrated to dryness under reduced temperature. The pale yellow residue is dissolved in chloroform and washed with water, with aqueous sodium bicarbonate, and finally with dilute hydrochloric acid. The chloroform solution is concentrated to dryness under reduced pressure and the residue is taken up in 1 cc. acetone. On adding two volumes of ether, the product separates as a pale yellow solid melting at approximately 241° C. Approximate analysis: C 58.32; H 6.36; N 12.48.

Example III 25 mg. of actinomycin A in 1 cc. of pyridine and 0.5 cc. of acetic anhydride are allowed to stand ten hours at room temperature, and then for two hours at 80° C. The red solution upon concentration to dryness under reduced pressure is dissolved in chloroform and the latter solution washed in the order mentioned with dilute hydrochloric acid and aqueous sodium bicarbonate. The chloroform solution is concentrated to dryness and the resulting product recrystallized from ethyl acetate. The same constitutes red-brick prisms melting at approximately 250° C. Approximate analysis: C 58.27; H 6.56; N 12.46.

The method of growing cultures of antagonists to specific bacteria outlined above can be demonstrated by way of the following example.

Example IV

Agar is washed in distilled water and dissolved so as to yield 1.5% concentration. Two gms. of $K_2HPO_4$ are added per liter. Ten milliliter portions of this agar are distributed in test tubes and sterilized. A washed suspension of *Escherichia coli*, or some other suitable bacterium, obtained by cultivation on solid or in liquid nutrient media is prepared and added to the washed agar which has previously been melted and placed in a water bath at 42° C. One milliliter portions of the still viable bacterial suspension are added to the agar tubes and thoroughly mixed with the agar.

A suitable soil is suspended in sterile tap water using a series of dilutions from 1:10 to 1:10,000. One milliliter portions of these dilutions are placed in sterile Petri dishes and the bacterial agar, prepared as above, is added. The plates are well shaken to distribute the soil suspension thoroughly and are incubated at 28° or 37° C. After one to ten days' incubation of the plates, colonies of the antagonists will appear being surrounded by clear zones. These colonies are transferred to fresh bacterial agar plates and are later isolated in pure culture by the use of convenient media. *Actinomyces antibioticus* is one of the antagonists isolated by this method.

We have further discovered a method and culture medium for increasing the production of actinomycin or its components by the cultures of *Actinomyces antibioticus*. The culture medium in accordance with this embodiment essentially comprises 1 to 10 and preferably 5 parts by weight of starch, 1 to 20 and preferably 10 parts by weight of a suitable nitrogen containing material of an organic or an inorganic nature, a small amount of buffering agent sufficient to maintain the pH of the culture substantially between pH 5.6 and pH 8 and preferably at pH7, 1 to 5 and preferably 2 parts by weight of a mineral salt, preferably sodium chloride, and 2 to 20, preferably 15 parts by weight agar, and 1000 parts by weight of water. The buffering agent may be any one of the known buffering agents and preferably $K_2HPO_4$; amounts of 1 to 3 and preferably 2 parts by weight of the buffering agent will yield the desired pH or pH range. As a source of nitrogen a variety of substances may be used including organic and inorganic nitrogen containing materials such as asparagine, alanine, phenylalanine, peptone, tryptone and sodium nitrate. We prefer, however, for best results, to use tryptone as the nitrogen yielding substance. Representative compositions of preferred formulae are, for instance, the following:

1.5% agar, 0.2% $K_2HPO_4$, 0.2% NaCl, 0.5 to 2% starch, 0.1 to 0.2% asparagine;

1.5% agar, 0.2% $K_2HPO_4$, 0.2% NaCl, 0.5% starch, 1% peptone;

1.5% agar, 0.2% $K_2HPO_4$, 0.2% NaCl, 0.5% starch, 1.0% tryptone;

0.25% agar, 0.2% $K_2HPO_4$, 0.2% NaCl, 1.5% starch, 0.2% $NaNO_3$.

Cultures are preferably incubated at 25 to 35° C., substantially maintaining the pH at the indicated point or range. Growth proceeds rapidly and is accompanied by the formation of a soluble dark-brown pigment on organic media. It becomes rapidly covered with a white mycelium having a faint yellowish-green tinge. After 6 to 10 days' incubation, growth and production of actinomycin are usually complete.

We have found that the actinomycin in accordance with our invention possesses a selective bacteriostatic action with respect to different varieties of bacteria and that the markedly greater sensitivity of some bacteria to actinomycin than of others may be utilized for the purpose of isolating specific organisms from a mixed population. Actinomycin has a bacteriostatic effect in relatively small concentrations on gram-positive bacteria, while it requires much higher concentrations to be effective bacteriostatically with respect to gram-negative bacteria. Thus, for instance, when adding 0.1 mg. actinomycin to 10 cc. agar and incubating thereon a substrate such as milk or sewage containing both gram-positive and gram-negative bacteria, the growth of the gram-positive bacteria will be inhibited by the actinomycin. Generally, concentrations of 0.1 to 1.0 mg. per 10 cc. agar permit the selective growth of various bacteria by reason of the differentiation in sensitivity of varying amounts of the active actinomycin with respect to specific bacterial growth.

Both the actinomycin A and actinomycin B possess a relatively high molecular weight. Actinomycin A has the general empirical composition of 58.7 to 59.3% C, 6.5 to 7.5% H, 13.05 to 13.65% N, and a molecular weight in excess of 700.

Modifications may be made in carrying out the present invention without departing from the spirit and scope thereof, and we are to be limited only by the appended claims.

We claim:

1. An antimicrobial substance predominantly comprising a substantially ether-soluble concentrate, extracted from an *Actinomyces antibioticus* culture, and composed of a high molecular, substantially water-soluble, petroleum ether insoluble component and a substantially high molecular, water-insoluble, petroleum ether-soluble component.

2. In the method of producing an antimicrobial substance the steps comprising treating a culture of *Actinomyces antibioticus* with ethyl ether to thereby extract actinomycin and recovering actinomycin from said ether extract.

3. In the method of producing an antimicrobial substance the steps comprising treating a culture of *Actinomyces antibioticus* with petroleum ether to thereby extract actinomycin B.

4. In the method of producing an antimicrobial substance the steps comprising treating a culture of *Actinomyces antibioticus* with a solvent comprising at least one member selected from the group consisting of ethyl ether, ethyl alcohol, carbon bisulphide, acetone, and separating by selective solvent extraction actinomycin A and actinomycin B.

5. Crude actinomycin A, an antimicrobial substance predominantly comprising a high molecular, substantially ether- and water-soluble, petroleum ether-insoluble concentrate, extracted from an *Actinomyces antibioticus* culture, and recovered as a dark reddish solid exhibiting strong absorption at 450 m$\mu$ and between 230 and 250 m$\mu$.

6. Crude actinomycin B, an antimicrobial substance predominantly comprising a high molecular, substantially water-insoluble, ether- and petroleum ether-soluble concentrate, extracted from an *Actinomyces antibioticus* culture, and recovered as a pale yellow oil.

7. The process that comprises treating a culture of *Actinomyces antibioticus* with an organic solvent to thereby extract from said culture a concentrate comprising at least one antimicrobial substance of the class consisting of actinomycin A and actinomycin B.

8. The process that comprises treating a culture of *Actinomyces antibioticus* with a solvent comprising at least one member of the class consisting of ethyl ether, ethyl alcohol, ethyl acetate, carbon disulfide, acetone and chloroform to thereby extract actinomycin from said culture.

9. As a new product, pure actinomycin A, which is identical with the actinomycin A extracted from cultures of *Actinomyces antibioticus*, which is a brick-red colored, crystalline, thermostable solid melting at approximately 250° C., and exhibiting strong absorption at 450 m$\mu$ and between 230 and 250 m$\mu$, and which has the approximate composition of 59.01% C, 6.81% H, 13.38% N, and a molecular weight in excess of 700.

SELMAN A. WAKSMAN.
HAROLD B. WOODRUFF.

---

CERTIFICATE OF CORRECTION.

Patent No. 2,378,876.                   June 19, 1945.

SELMAN A. WAKSMAN, ET AL.

It is hereby certified that error appears in the printed specification of the above numbered patent requiring correction as follows: Page 1, first column, line 42, for "antinomycetes" read --actinomycetes--; line 46, for "antinomycin" read --actinomycin--; and second column, line 11, for "in either" read --in ether--; and that the said Letters Patent should be read with this correction therein that the same may conform to the record of the case in the Patent Office.

Signed and sealed this 20th day of November, A. D. 1945.

Leslie Frazer (Seal)               First Assistant Commissioner of Patents.

comes rapidly covered with a white mycelium having a faint yellowish-green tinge. After 6 to 10 days' incubation, growth and production of actinomycin are usually complete.

We have found that the actinomycin in accordance with our invention possesses a selective bacteriostatic action with respect to different varieties of bacteria and that the markedly greater sensitivity of some bacteria to actinomycin than of others may be utilized for the purpose of isolating specific organisms from a mixed population. Actinomycin has a bacteriostatic effect in relatively small concentrations on gram-positive bacteria, while it requires much higher concentrations to be effective bacteriostatically with respect to gram-negative bacteria. Thus, for instance, when adding 0.1 mg. actinomycin to 10 cc. agar and incubating thereon a substrate such as milk or sewage containing both gram-positive and gram-negative bacteria, the growth of the gram-positive bacteria will be inhibited by the actinomycin. Generally, concentrations of 0.1 to 1.0 mg. per 10 cc. agar permit the selective growth of various bacteria by reason of the differentiation in sensitivity of varying amounts of the active actinomycin with respect to specific bacterial growth.

Both the actinomycin A and actinomycin B possess a relatively high molecular weight. Actinomycin A has the general empirical composition of 58.7 to 59.3% C, 6.5 to 7.5% H, 13.05 to 13.65% N, and a molecular weight in excess of 700.

Modifications may be made in carrying out the present invention without departing from the spirit and scope thereof, and we are to be limited only by the appended claims.

We claim:

1. An antimicrobial substance predominantly comprising a substantially ether-soluble concentrate, extracted from an *Actinomyces antibioticus* culture, and composed of a high molecular, substantially water-soluble, petroleum ether insoluble component and a substantially high molecular, water-insoluble, petroleum ether-soluble component.

2. In the method of producing an antimicrobial substance the steps comprising treating a culture of *Actinomyces antibioticus* with ethyl ether to thereby extract actinomycin and recovering actinomycin from said ether extract.

3. In the method of producing an antimicrobial substance the steps comprising treating a culture of *Actinomyces antibioticus* with petroleum ether to thereby extract actinomycin B.

4. In the method of producing an antimicrobial substance the steps comprising treating a culture of *Actinomyces antibioticus* with a solvent comprising at least one member selected from the group consisting of ethyl ether, ethyl alcohol, carbon bisulphide, acetone, and separating by selective solvent extraction actinomycin A and actinomycin B.

5. Crude actinomycin A, an antimicrobial substance predominantly comprising a high molecular, substantially ether- and water-soluble, petroleum ether-insoluble concentrate, extracted from an *Actinomyces antibioticus* culture, and recovered as a dark reddish solid exhibiting strong absorption at 450 mµ and between 230 and 250 mµ.

6. Crude actinomycin B, an antimicrobial substance predominantly comprising a high molecular, substantially water-insoluble, ether- and petroleum ether-soluble concentrate, extracted from an *Actinomyces antibioticus* culture, and recovered as a pale yellow oil.

7. The process that comprises treating a culture of *Actinomyces antibioticus* with an organic solvent to thereby extract from said culture a concentrate comprising at least one antimicrobial substance of the class consisting of actinomycin A and actinomycin B.

8. The process that comprises treating a culture of *Actinomyces antibioticus* with a solvent comprising at least one member of the class consisting of ethyl ether, ethyl alcohol, ethyl acetate, carbon disulfide, acetone and chloroform to thereby extract actinomycin from said culture.

9. As a new product, pure actinomycin A, which is identical with the actinomycin A extracted from cultures of *Actinomyces antibioticus*, which is a brick-red colored, crystalline, thermostable solid melting at approximately 250° C., and exhibiting strong absorption at 450 mµ and between 230 and 250 mµ, and which has the approximate composition of 59.01% C, 6.81% H, 13.38% N, and a molecular weight in excess of 700.

SELMAN A. WAKSMAN.
HAROLD B. WOODRUFF.

CERTIFICATE OF CORRECTION.

Patent No. 2,378,876.                                June 19, 1945.

SELMAN A. WAKSMAN, ET AL.

It is hereby certified that error appears in the printed specification of the above numbered patent requiring correction as follows: Page 1, first column, line 42, for "antinomycetes" read --actinomycetes--; line 46, for "antinomycin" read --actinomycin--; and second column, line 11, for "in either" read --in ether--; and that the said Letters Patent should be read with this correction therein that the same may conform to the record of the case in the Patent Office.

Signed and sealed this 20th day of November, A. D. 1945.

Leslie Frazer (Seal)                    First Assistant Commissioner of Patents.